US011906136B1

(12) United States Patent
Pang et al.

(10) Patent No.: US 11,906,136 B1
(45) Date of Patent: Feb. 20, 2024

(54) PROJECTION LAMP

(71) Applicant: Guangzhou Colorful Stage Equipment Co., Ltd, Guangzhou (CN)

(72) Inventors: Haiquan Pang, Guangzhou (CN); Kehua Tan, Guangzhou (CN); Minghua Yang, Guangzhou (CN)

(73) Assignee: Guangzhou Colorful Stage Equipment Co., Ltd, Guangzhou (CN)

(*) Notice: Subject to any disclaimer, the term of this patent is extended or adjusted under 35 U.S.C. 154(b) by 0 days.

(21) Appl. No.: 18/387,867

(22) Filed: Nov. 8, 2023

(51) Int. Cl.

| | |
|---|---|
| ***F21V 11/00*** | (2015.01) |
| ***F21V 5/04*** | (2006.01) |
| ***F21V 17/10*** | (2006.01) |
| *F21Y 113/10* | (2016.01) |
| *F21Y 115/10* | (2016.01) |

(52) U.S. Cl.
CPC ................ *F21V 11/00* (2013.01); *F21V 5/04* (2013.01); *F21V 17/105* (2013.01); *F21Y 2113/10* (2016.08); *F21Y 2115/10* (2016.08)

(58) Field of Classification Search
CPC .......... F21V 11/00; F21V 5/04; F21V 17/105; F21V 13/00; F21V 13/02; F21V 13/04; F21V 13/045; F21V 13/12; F21V 14/06; F21V 14/065; F21V 14/08; F21V 14/085; F21Y 2113/10; F21Y 2115/10
See application file for complete search history.

(56) References Cited

U.S. PATENT DOCUMENTS

| | | | | |
|---|---|---|---|---|
| 8,408,736 B2 * | 4/2013 | Chien | F21S 4/28 362/249.02 |
| 11,041,596 B1 * | 6/2021 | Zhang | F21V 3/049 |
| 11,118,753 B1 * | 9/2021 | Zheng | F21V 33/0056 |
| 11,287,094 B2 * | 3/2022 | Zheng | F21V 33/0056 |
| 11,454,375 B1 * | 9/2022 | Xiong | G02B 27/0972 |
| 2021/0247039 A1 * | 8/2021 | Zheng | F21V 5/04 |

* cited by examiner

*Primary Examiner* — Bao Q Truong

(57) ABSTRACT

A projection lamp is provided, which includes a first shell assembly, a projection assembly and a light shielding member. The first shell assembly includes a transparent mask. The projection assembly includes an optical lens, an optical element, a light source and a driving source for driving the optical element to move. The optical element is positioned to direct light from the light source to the optical lens when the light source is powered. At least part of the light shielding member is disposed between the peripheral region of the transparent mask and the peripheral region of the optical lens. The light shielding member has a first opening, and the light from the light source only passes through the first opening of the light shielding member to emit out from the transparent mask after passing through the optical lens.

16 Claims, 7 Drawing Sheets

PROJECTION LAMP

TECHNICAL FIELD

The present disclosure relates to the field of optical imaging, and in particular to a projection lamp.

DESCRIPTION OF THE PRIOR ART

Projection lamp is an entertainment product that can project stars, moon, aurora and other patterns on walls, ceilings, etc. to create a quiet, romantic and comfortable atmosphere, which has a very wide range of applications in daily life. However, the patterns projected by existing commercial projection lamps are often interfered with by stray light, resulting in poor projection effects and affecting the user experience.

SUMMARY OF THE DISCLOSURE

In view of this, the present disclosure aims to provide a projection lamp that can solve or at least alleviate the above problems.

The projection lamp according to the present disclosure includes a head. The head includes:

- a first shell assembly, including an opaque bottom shell and a transparent mask connected to the opaque bottom shell, the transparent mask including a central region and a peripheral region surrounding the central region;
- a projection assembly arranged in the first shell assembly, including an optical lens, an optical element, a light source and a driving source for driving the optical element to move, the optical lens including a central region and a peripheral region surrounding the central region, the optical element being positioned to direct light from the light source to the optical lens when the light source is powered; and
- a light shielding member, at least part of which is disposed between the peripheral region of the transparent mask and the peripheral region of the optical lens, the light shielding member having a first opening in a middle portion thereof so that the central region of the optical lens is aligned with the central region of the transparent mask, wherein the light from the light source only passes through the first opening of the light shielding member to emit out from the transparent mask after passing through the optical lens.

In the projection lamp provided by the present disclosure, due to the light shielding member, when the light source is powered, the light from the light source can only pass through the first opening of the light shielding member after being emitted through the first optical lens and then be emitted through the transparent mask. In other words, the light cannot pass through the solid material of the light shielding member. Therefore, the light shielding member can effectively prevent stray light from interfering with the projection effect. Further, due to the difference of the materials of the light shielding member and the transparent mask, at least part of the light shielding member (arranged between the peripheral region of the transparent mask and the peripheral region of the first optical lens) can be seen from the outside, presenting color difference in different areas, enhancing the stereoscopic effect and increasing interest.

BRIEF DESCRIPTION OF DRAWINGS

Further features of the present disclosure will become apparent from the following description of preferred embodiments, which are illustrated by way of example only with reference to the accompanying drawings, in which.

DESCRIPTION OF EMBODIMENTS

Figure 1:
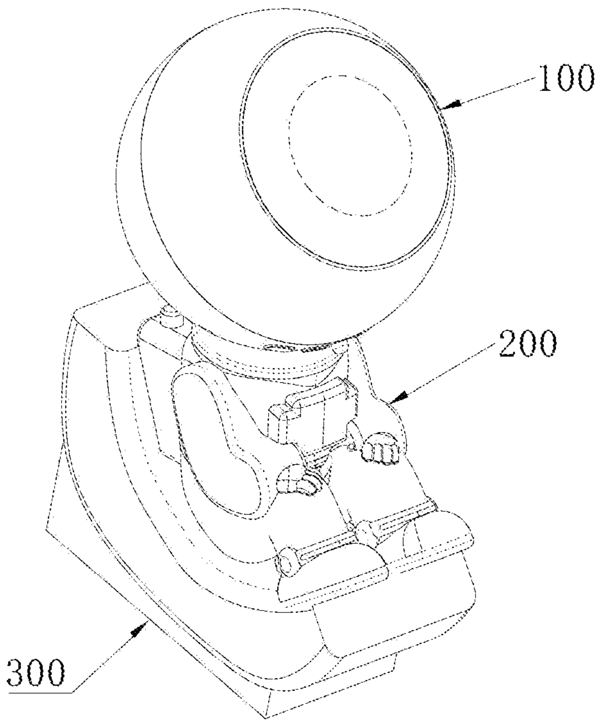
FIG. 1 is a perspective view of a projection lamp according to a first embodiment of the present disclosure.

The present disclosure will be described in detail below in conjunction with the accompanying drawings and specific embodiments, so as to make the technical solution and beneficial effects of the present disclosure apparent. It can be appreciated that the drawings are only for reference and illustration, and are not intended to limit the present disclosure. The dimensions shown in the drawings are only for the convenience of clear illustration, without limiting the proportional relationship.

Referring to FIG. 1, a projection lamp according to a first embodiment of the present disclosure includes a head 100, a main body 200 and a base 300. In this embodiment, the head 100 is spherical and is located on the top of the main body 200, similar to an astronaut's head. The main body 200 is similar to an astronaut's body. The base 300 is moon-like and located at the bottom of the main body 200. In other words, the projection lamp according to this embodiment is shaped like an astronaut sitting on the moon. It would be appreciated that in other embodiments, the projection lamp may have other forms. For example, the head 100 may be held by the main body 200 in front, or the main body 200 may have other postures, or the base 300 may be located on the back of the main body 200, or the base 300 may be removed.

Figure 2:
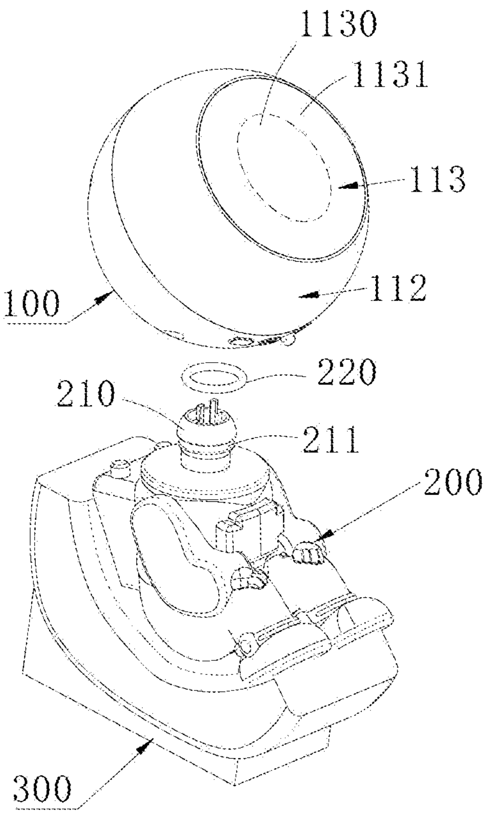
FIG. 2 is an exploded view of the projection lamp shown in FIG. 1.
Figure 3:
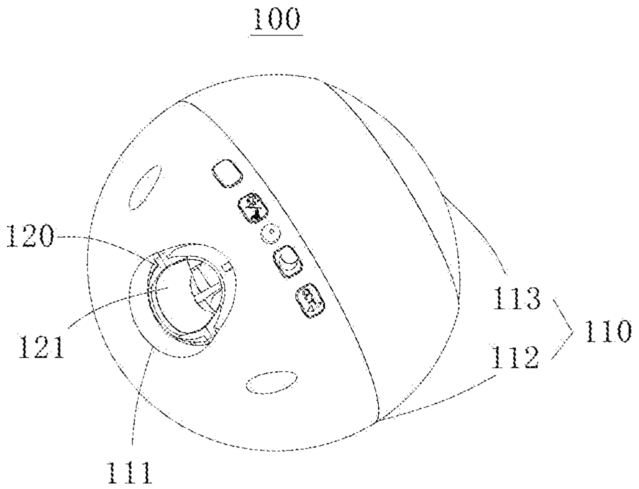
FIG. 3 is a perspective view of the head of the projection lamp shown in FIG. 2.

Referring to FIGS. 2 and 3, preferably, the head 100 is movably connected to the main body 200, more preferably in ball joint. Specifically, the head 100 includes a first shell assembly 110 and a support 120 provided in the first shell assembly 110. The first shell assembly 110 is spherical and has a through hole 111. The support 120 has a first receiving portion 121. The first receiving portion 121 is aligned with and communicates with the through hole 111. The main body 200 includes a ball pin 210. The ball pin 210 passes through the through hole 111 and is received in the first receiving portion 121 of the support 120. The ball pin 210 and the first receiving portion 121 can rotate relative to each other, whereby the head 100 and the main body 200 can rotate relative to each other.

Preferably, a damping member 220 is further disposed between the ball pin 210 and the first receiving portion 121 of the support 120 to position the head 100 and the main body 200. For example, when the head 100 rotates by a certain angle relative to the main body 200, the position of the head 100 relative to the main body 200 can be maintained by the damping member 220, preventing the head 100 from turning back. Specifically, the ball pin 210 is recessed and has an annular groove 211, and the damping member 220 is received in the annular groove 211. Optionally, the damping member 220 is a rubber ring.

In this embodiment, the first shell assembly 110 includes an opaque bottom shell 112 and a transparent mask 113 connected to the opaque bottom shell 112. For example, the opaque bottom shell 112 may be made of opaque plastic material. The through hole 111 is formed in the opaque bottom shell 112. The transparent mask 113 is made of transparent material, such as transparent plastic. The transparent mask 113 includes a central region 1130 and a peripheral region 1131 surrounding the central region 1130.

Figure 4:
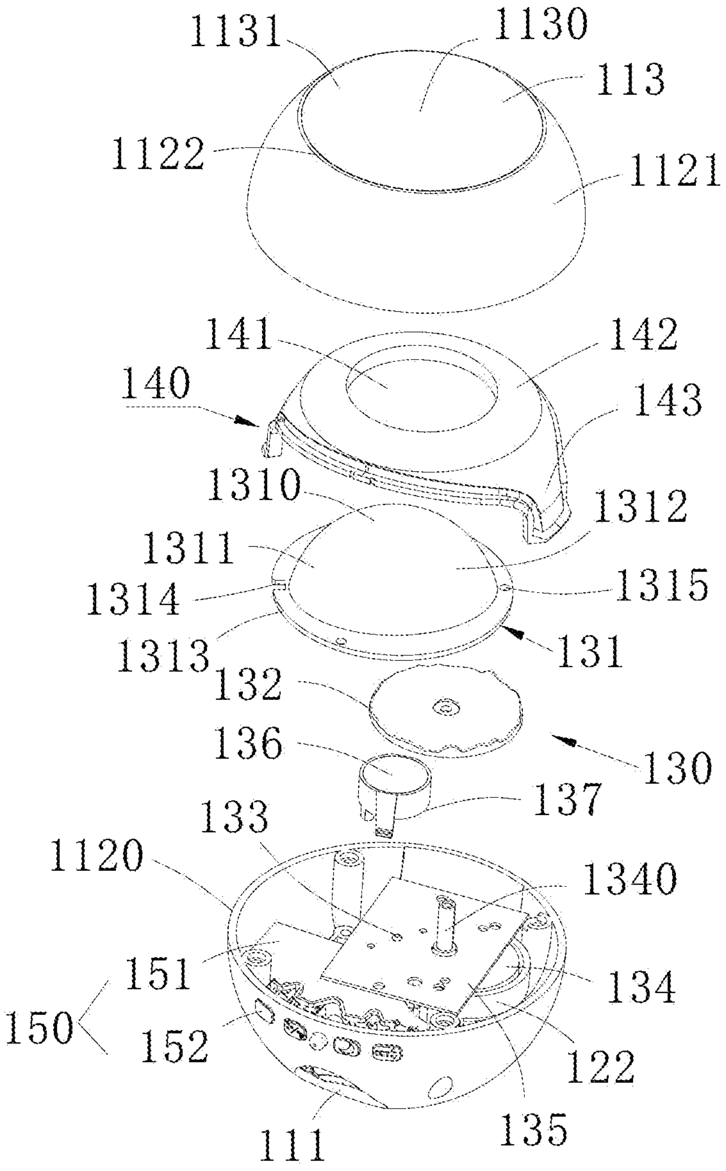
FIG. 4 is an exploded view of the head of the projection lamp shown in FIG. 3.

Referring to FIG. 4, in this embodiment, the head 100 further includes a projection assembly 130 and a light shielding member 140 arranged in the first shell assembly 110. The projection assembly 130 includes a first optical lens 131, an optical element 132, a light source 133 and a driving source 134.

In this embodiment, the first optical lens 131 includes a central region 1310 and a peripheral region 1311 surrounding the central region 1310. The optical element 132 is positioned to direct light from the light source 133 to the first optical lens 131 when the light source 133 is powered. The driving source 134 is used to drive the optical element 132 to move, preferably, to rotate.

The light shielding member 140 is made of an opaque material (such as dark plastic), and is at least partially disposed between the peripheral region 1131 of the transparent mask 113 and the peripheral region 1311 of the first optical lens 131. The light shielding member 140 has a first opening 141 in the middle portion thereof, so that the central region 1310 of the first optical lens 131 can be aligned with the central region 1130 of the transparent mask 113.

When the light source 133 is powered, the light from the light source 133 is guided to the first optical lens 131 via the optical element 132 and then emitted through the transparent mask 113 and finally projected onto the wall or ceiling to form a pattern. In addition, since the optical element 132 is driven to move by the driving source 134, the projected pattern is dynamic, increasing interest.

In particular, due to the light shielding member 140, when the light source 133 is powered, the light from the light source 133 can only pass through the first opening 141 of the light shielding member 140 after being emitted through the first optical lens 131 and then be emitted through the transparent mask 113. In other words, the light cannot pass through the solid material of the light shielding member 140. Therefore, the light shielding member 140 can effectively prevent stray light from interfering with the projection effect.

Further, due to the difference of the materials of the light shielding member 140 and the transparent mask 113, at least part of the light shielding member 140 (arranged between the peripheral region 1131 of the transparent mask 113 and the peripheral region 1311 of the first optical lens 131) can be seen from the outside, presenting color difference in different areas, enhancing the stereoscopic effect and increasing interest.

In particular, in this embodiment, the first optical lens 131 includes a hemispherical main portion 1312 and a flange 1313 surrounding the hemispherical main portion 1312. The central region 1310 and the peripheral region 1311 of the first optical lens 131 are defined by the hemispherical main portion 1312. Preferably, the central region 1310 of the first optical lens 131 is aligned with and protrudes from the first opening 141 of the light shielding member 140. In this embodiment, the hemispherical main portion 1312 is configured as a convex lens for condensing light. In other embodiments, the hemispherical main portion 1312 may be hollow and include a plurality of convex lenses. The flange 1313 is provided with a notch 1314 and a positioning hole 1315 for connecting with the light shielding member 140.

In this embodiment, the optical element 132 is configured as a refractive element with a plurality of plano-convex lenses (not shown). The optical element 132 is axially located between the light source 133 and the first optical lens 131 and is arranged eccentrically relative to the first optical lens 131 and the light source 133. Preferably, the optical element 132 completely covers the light source 133 in the axial direction. Further preferably, the first optical lens 131 completely covers the optical element 132 in the axial direction. Light from the light source 133 is adapted to be emitted through the optical element 132 to the first optical lens 131.

In this embodiment, the light source 133 is an LED bead, which is installed on a substrate 135. Preferably, the projection assembly 130 further includes a second optical lens 136, and the second optical lens 136 is configured as a condenser lens to improve the projection effect. Specifically, the second optical lens 136 is located between the light source 133 and the optical element 132, and the second optical lens 136 is positioned to direct the light from the light source 133 to the optical element 132 when the light source 133 is powered.

Preferably, the second optical lens 136 is arranged coaxially with the light source 133 and the first optical lens 131. Therefore, it is not difficult to understand that the optical element 132 is also arranged eccentrically with respect to the second optical lens 136. Preferably, the optical element 132 completely covers the second optical lens 136 in the axial direction. More preferably, the second optical lens 136 is arranged on one side of the central axis of the optical element 132. Further preferably, the diameter of the second optical lens 136 is equal to or substantially equal to the radius of the optical element 132.

Therefore, the light emitted from the light source 133 will enter the corresponding eccentric portion on one side of the central axis of the optical element 132 through the second optical lens 136, and with the circumferential movement of the optical element 132, the light emitted from the light source 133 will pass through the second optical lens 136 and then continuously pass through the eccentric portions distributed along the circumference of the optical element 132, that is, every circle the optical element 132 rotates, the light emitted from the light source 133 will pass through one circumference of the optical element 132 through the second optical lens 136, and such a process will be repeated along with the repeated circumferential movement of the optical element 132, so that the light emitted from the transparent mask 113 presents a dynamically changing pattern.

As an example, in this embodiment, the second optical lens 136 is installed on the substrate 135 through a mounting seat 137. Alternatively, in other embodiments, the second optical lens 136 may be removed.

In this embodiment, the driving source 134 is a motor, which is installed on a side of the substrate 135 away from the light source 133. As an example, the driving source 134 is installed in a second receiving portion 122 of the support 120. The output shaft 1340 of the driving source 134 passes through the substrate 135 and is connected to the center of the optical element 132 to drive the optical element 132 to rotate. In other embodiments, the driving source 134 can function to drive the optical element 132 to move in other forms, such as to move back and forth.

In this embodiment, the head 100 further includes a control component 150. The control component 150 includes a first circuit board 151 and one or more buttons 152 electrically connected to the first circuit board 151. The first circuit board 151 is arranged in the first shell assembly 110 and is electrically connected to the light source 133 and the driving source 134. The one or more buttons 152 are arranged on the outer surface of the opaque bottom shell 112.

Figure 5:
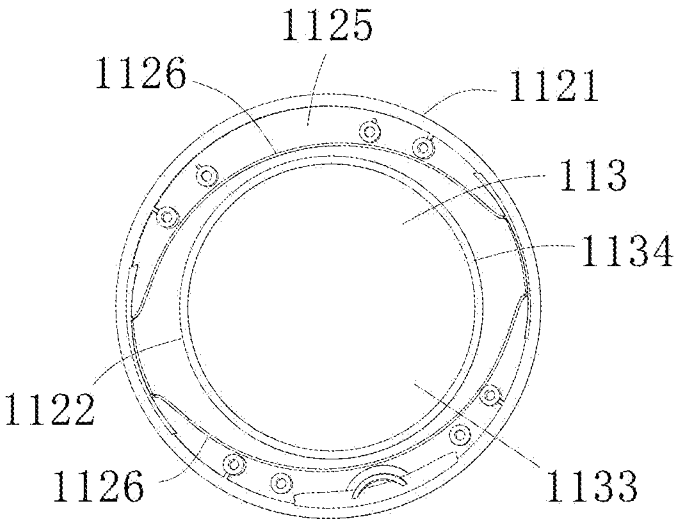
FIG. 5 is a bottom view of the second half shell and transparent mask of the head of the projection lamp shown in FIG. 4.
Figure 6:
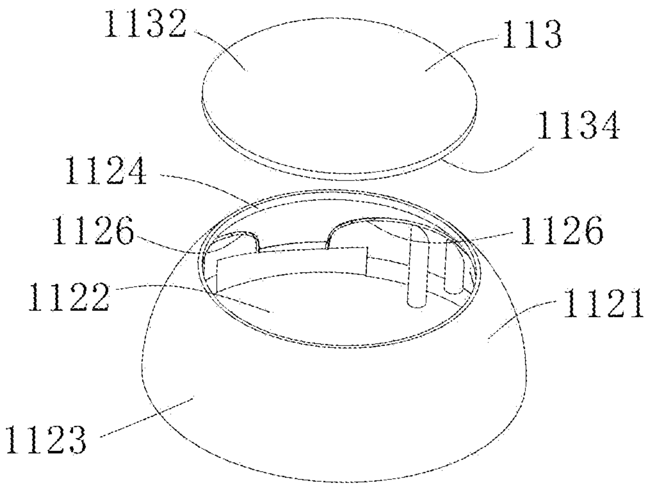
FIG. 6 is an exploded view of the second half shell and transparent mask of the head of the projection lamp shown in FIG. 4.

Referring to FIGS. 4 to 6, in this embodiment, the opaque bottom shell 112 includes a hemispherical first half shell 1120 and a second half shell 1121 shaped as a frustum of a cone. The second half shell 1121 and the first half shell 1120 are connected with each other, for example, by screws. The second half shell 1121 has a second opening 1122 in the middle portion thereof. The transparent mask 113 is fixed in the second opening 1122 and protrudes from the second opening 1122.

Specifically, in this embodiment, the transparent mask 113 has a circular outer contour, including an outer surface 1132 and an opposing inner surface 1133. The outer surface 1132 of the transparent mask 113 is an arc-shaped convex surface. Preferably, the outer surface 1132 of the transparent mask 113 and the outer surface 1123 of the second half shell 1121 are on the same spherical surface or substantially on the same spherical surface. The inner surface 1133 of the transparent mask 113 is an arc-shaped concave surface. As mentioned above, since the central region 1310 of the first optical lens 131 is aligned with and protrudes from the first opening 141 of the light shielding member 140, the inner surface 1133 of the transparent mask 113 and the central region 1310 of the first optical lens 131 are opposite to and adjacent to each other.

In this embodiment, the transparent mask 113 further includes a fixing edge 1134 protruding from the outer peripheral edge of the inner surface 1133. The fixing edge 1134 is tightly engaged with the wall 1124 defining the second opening 1122, thereby connecting the transparent mask 113 and the second half shell 1121. It is understood that in other embodiments, the transparent mask 113 and the second half shell 1121 can be connected in other ways.

In this embodiment, one or more flanges 1126 are formed on the inner surface 1125 of the second half shell 1121 for connecting with the light shielding member 140. As shown in FIGS. 5 and 6, in this embodiment, two opposite flanges 1126 are provided on the inner surface 1125 of the second half shell 1121. Each flange 1126 is arc-shaped, and spans approximately 180 degrees of the inner surface 1125 of the second half shell 1121 in the circumferential direction. Two opposite ends of the flange 1126 are further away from the second opening 1122 than the middle portion thereof.

Figure 7:
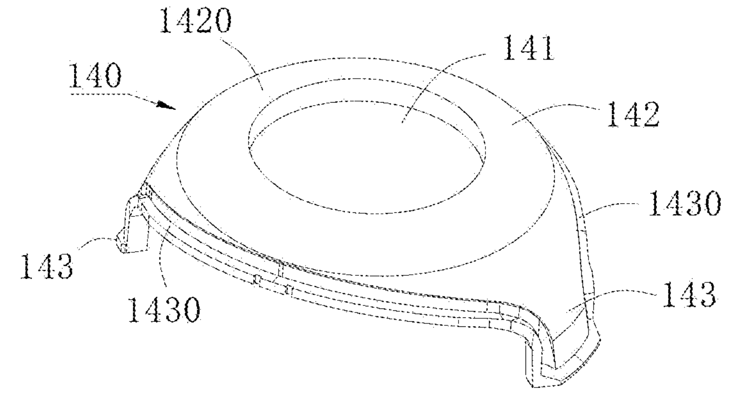
FIG. 7 is a perspective view of the light shielding member of the projection lamp shown in FIG. 4.
Figure 8:
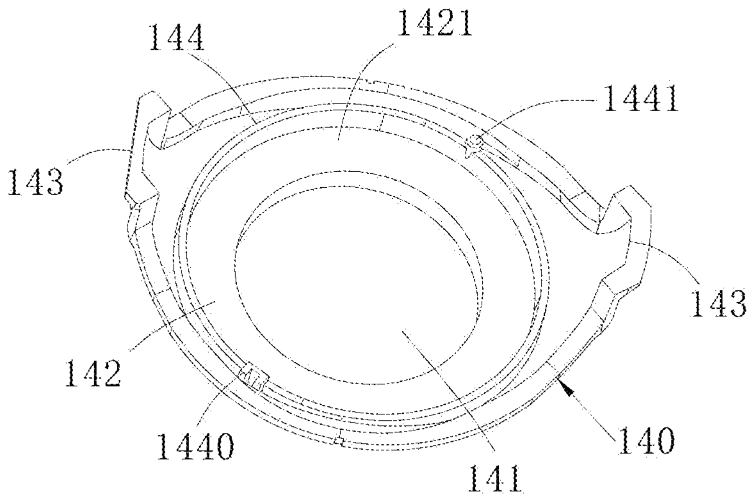
FIG. 8 is another perspective view of the light shielding member shown in FIG. 7.

Referring to FIGS. 4, 7 and 8, in this embodiment, the light shielding member 140 includes an annular body 142 and two ears 143 respectively connected to opposite sides of the annular body 142. The annular main portion 142 defines the first opening 141 and includes an upper surface 1420 and an opposing lower surface 1421. The upper surface 1420 is preferably arc-shaped. Further, at least part of the annular main portion 142 corresponds to the second opening 1122 of the second half shell 1121 and is located between the peripheral region 1131 of the transparent mask 113 and the peripheral region 1311 of the first optical lens 131. In other words, at least part of the upper surface 1420 of the annular main portion 142 can be seen from the outside of the transparent mask 113.

Furthermore, two grooves 1430 are provided on the outer periphery of the light shielding member 140. Each groove 1430 extends from one side of one ear 143, lateral to the side of the annular main portion 142, to the corresponding side of the other ear 143. During installation, the two grooves 1430 of the light shielding member 140 and the two flanges 1126 of the second half shell 1121 are engaged with each other one-to-one. In other embodiments, the flange may be formed on the light shielding member 140 and the groove may be formed on the second half shell 1121, so as to connect the light shielding member 140 and the second half shell 1121.

For convenience of the installation of the first optical lens 131, in this embodiment, the light shielding member 140 further includes a ring 144 protruding from the lower surface 1421 of the annular body 142. The ring 144 is provided with a protruding block 1440 and a protruding post 1441 for respectively engaging with the notch 1314 and the positioning hole 1315 of the first optical lens 131, so as to position the first optical lens 131. It can be understood that in other embodiments, the light shielding member 140 and the first optical lens 131 can be connected with each other in other ways.

Figure 9:
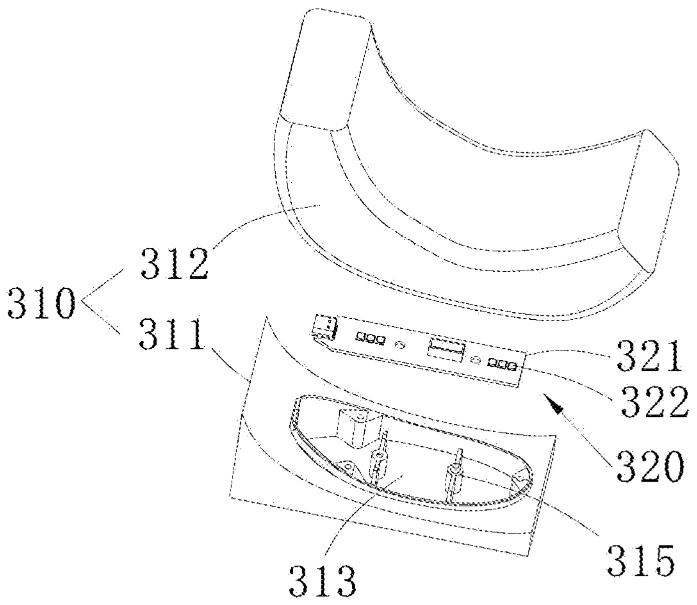
FIG. 9 is an exploded view of the base of the projection lamp shown in FIG. 2.
Figure 10:
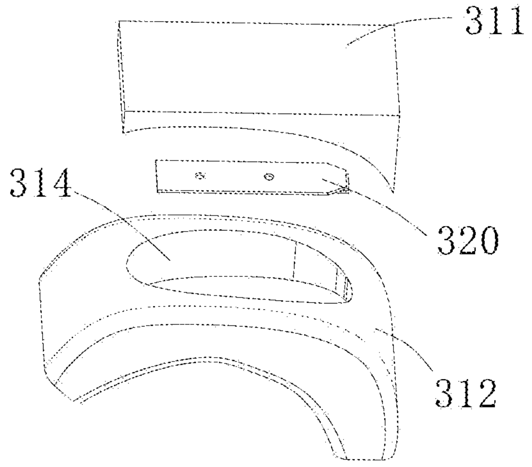
FIG. 10 is another exploded view of the base of the projection lamp shown in FIG. 2.

Referring to FIGS. 2, 9 and 10, in this embodiment, the base 300 includes a second shell assembly 310 connected to the main body 200 and a light-emitting component 320 accommodated in the second shell assembly 310.

The second shell assembly 310 includes an opaque base 311 and a translucent shell 312 connected to the opaque base 311. For example, the opaque base 311 can be made of opaque plastic, and is recessed on the side facing the translucent shell 312 to form a first chamber 313. One or more mounting posts 315 are provided in the first chamber 313. The translucent shell 312 may be made of, for example, translucent plastic, and is recessed on the side facing the opaque base 311 to form a second chamber 314.

The light-emitting component 320 includes a second circuit board 321 and at least one lamp bead 322 provided on the circuit board 321. The second circuit board 321 is fixed on the one or more mounting posts 315. The at least one lamp bead 322 is electrically connected to the second circuit board 321. When the at least one lamp bead 322 is powered, light from the at least one lamp bead 322 is emitted into the second chamber 314 and emitted through the translucent shell 312, so that the projection lamp can also be used as a night light, in addition to projecting patterns. Preferably, the at least one lamp bead 322 includes at least two LED lights with different colors, so that the user can adjust the night light to different colors.

Figure 11:
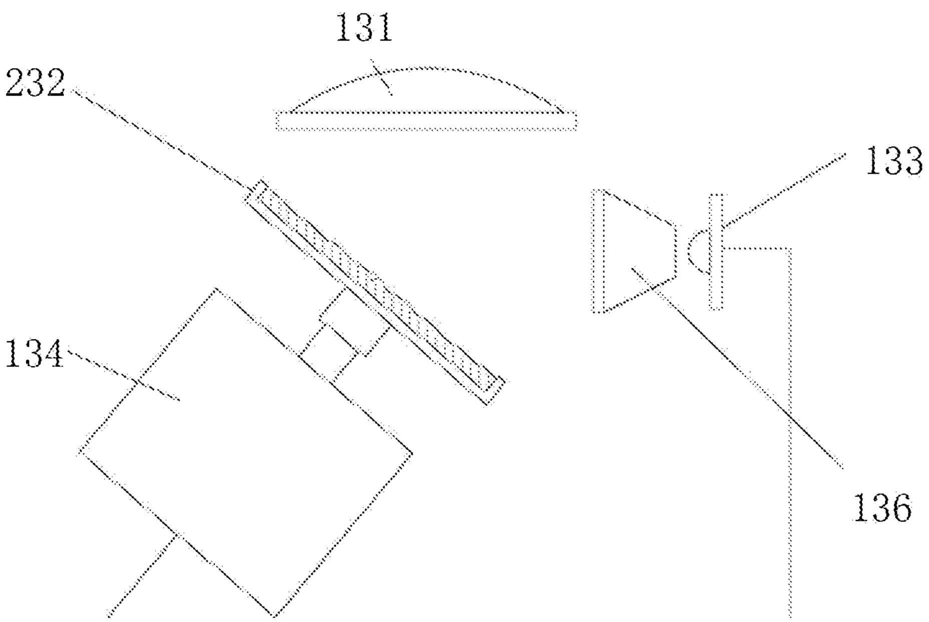
FIG. 11 is a schematic view of a projection assembly of a projection lamp according to a second embodiment of the present disclosure.

Referring to FIG. 11, the projection lamp according to a second embodiment of the present disclosure is substantially the same as the projection lamp according to the first embodiment above, and the similarities will not be repeated here again. The main difference between the projection lamp according to the second embodiment of the present disclosure and the projection lamp according to the aforementioned first embodiment lies in the projection assembly.

Specifically, in this embodiment, the projection assembly includes a first optical lens 131, a second optical lens 136, an optical element 232, a light source 133 and a driving source 134, and the optical element 232 is no longer a refractive element, but a reflective element. Accordingly, the arrangement of the first optical lens 131, the second optical lens 136, the optical element 232, the light source 133 and the driving source 134 is also changed. As shown in FIG. 11, the light source 133 and the second optical lens 136 are coaxially arranged. The driving source 134 is coaxially arranged with the optical element 232, but the optical element 232 is no longer eccentrically arranged with respect to the light source 133 and the second optical lens 136, but is arranged opposite to the light source 133 and the second optical lens 136. Similarly, the optical element 232 is also no longer arranged eccentrically with respect to the first optical lens 131, but is arranged opposite to the first optical lens 131. The first optical lens 131, the optical element 232 and the second optical lens 136 form a triangular-like arrangement.

When the light source 133 is powered, light from the light source 133 is emitted to the surface of the optical element 232 through the second optical lens 136 and is reflected from the surface of the optical element 232 to the first optical lens 131 for projection.

Figure 12:
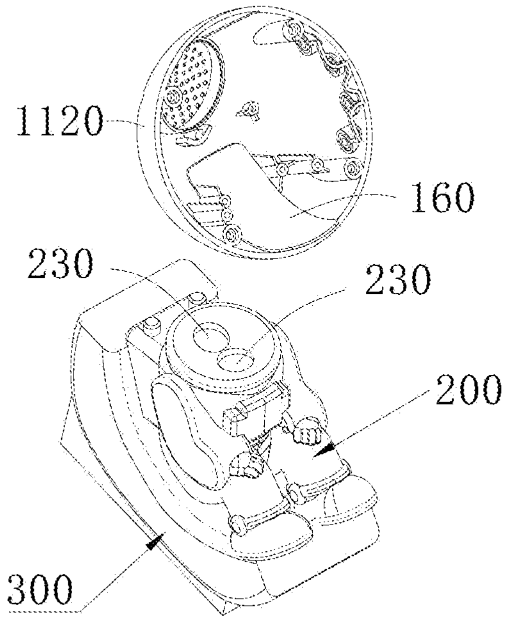
FIG. 12 is a schematic view of a projection assembly of a projection lamp according to a third embodiment of the present disclosure, with some parts of the head not shown.

Referring to FIG. 12, the projection lamp according to a third embodiment of the present disclosure is substantially the same as the projection lamp according to the first embodiment above, and the similarities will not be repeated here again. The main difference between the projection lamp according to the third embodiment of the present disclosure and the projection lamp according to the aforementioned first embodiment lies in the connection between the head and the main body 200. In this embodiment, the main body 200 is detachably connected with the head by means of magnetic attraction. Specifically, the main body 200 includes two magnets 230, the head includes an iron sheet 160 disposed within the first shell assembly 110 (only the first half shell 1120 is shown in order to show the iron sheet 160). The magnets 230 attract the iron sheet 160, thereby connecting the head and the main body 200. Alternatively, one or more magnets 230 can be provided in the main body 200, or the magnet can be disposed within the head, while the iron sheet can be disposed within the main body.

The above description is only preferred embodiments of the present disclosure, and the scope of protection of the present disclosure is not limited to the examples listed above. Simple changes or equivalents to the implementations made by any skilled person in the field within the scope disclosed in the present disclosure all fall within the protection scope of the present disclosure.

The invention claimed is:

1. A projection lamp, comprising a head which comprises:

a first shell assembly, comprising an opaque bottom shell and a transparent mask connected to the opaque bottom shell, the transparent mask comprising a central region and a peripheral region surrounding the central region;

a projection assembly arranged in the first shell assembly, comprising an optical lens, an optical element, a light source and a driving source for driving the optical element to move, the optical lens comprising a central region and a peripheral region surrounding the central region, the optical element being positioned to direct light from the light source to the optical lens when the light source is powered; and a light shielding member, at least part of which is disposed between the peripheral region of the transparent mask and the peripheral region of the optical lens, the light shielding member having a first opening in a middle portion thereof so that the central region of the optical lens is aligned with the central region of the transparent mask, wherein the light from the light source only passes through the first opening of the light shielding member to emit out from the transparent mask after passing through the optical lens.

2. The projection lamp according to claim 1, wherein the central region of the optical lens is aligned with the first opening of the light shielding member and protrudes from the first opening of the light shielding member.

3. The projection lamp according to claim 1, wherein the optical element is a refractive element located between the light source and the optical lens, and the light from the light source passes through the refractive element and then emits to the optical lens.

4. The projection lamp according to claim 1, wherein the optical element is a reflective element, and the light from the light source is reflected from the reflective element to the optical lens.

5. The projection lamp according to claim 1, wherein the opaque bottom shell comprises a hemispherical first half shell and a second half shell connected to the first half shell, the second half shell has a second opening in a middle portion thereof, and the transparent mask protrudes from the second opening of the second half shell.

6. The projection lamp according to claim 5, wherein the light shielding member comprises an annular body, the annular body defines the first opening, and at least part of the annular body corresponds to the second opening of the second half shell and is located between the peripheral region of the transparent mask and the peripheral region of the optical lens.

7. The projection lamp according to claim 6, wherein the light shielding member further comprises two ears respectively connected to opposite sides of the annular main portion, and the two ears are connected to an inner wall of the second half shell.

8. The projection lamp according to claim 5, wherein one of the light shielding member and the second half shell is provided with a flange, and the other is provided with a groove engaging with the flange.

9. The projection lamp according to claim 1, further comprising a main body movably connected with the head.

10. The projection lamp according to claim 9, wherein the main body and the head are connected through a ball joint.

11. The projection lamp according to claim 9, wherein the first shell assembly has a through hole, the head further comprises a support arranged in the first shell assembly for supporting at least part of the projection assembly, a ball pin is provided on the main body, and the ball pin passes through the through hole and is movably connected to the support.

12. The projection lamp according to claim 11, wherein a damping member is further arranged between the ball pin and the support.

13. The projection lamp according to claim 9, further comprising a second shell assembly connected to the main body and a light-emitting component accommodated in the second shell assembly, the second shell assembly comprises a translucent shell, the light-emitting component comprises a circuit board and at least one lamp bead disposed on the circuit board, and light from the at least one lamp bead is emitted out through the translucent shell.

14. The projection lamp according to claim 13, wherein the at least one lamp bead comprises at least two LED lights with different colors.

15. The projection lamp according to claim 1, further comprising a main body which is detachably connected with the head by means of magnetic attraction.

16. The projection lamp according to claim 15, the main body comprises one or more magnets, the head comprises an iron sheet disposed within the first shell assembly, and the one or more magnets attracts the iron sheet.

* * * * *